Patented Sept. 13, 1932

1,876,560

UNITED STATES PATENT OFFICE

RAINALD BRIGHTMAN, OF MANCHESTER, ENGLAND, ASSIGNOR TO IMPERIAL CHEMICAL INDUSTRIES LIMITED, OF WESTMINSTER, ENGLAND

PROCESS OF DYEING VISCOSE RAYON AND THE DYED MATERIAL THUS OBTAINED

No Drawing. Application filed February 10, 1932, Serial No. 592,188, and in Great Britain March 13, 1929.

In a copending application Serial No. 427,961, filed February 12, 1930, of which the present application is a continuation in part, I have described a certain generic class of new trisazo dyes and methods of preparing the same. This generic class of dyes may be represented by the following characteristic structure:

$$R_4 - N=N - R_1 - N=N - R_2 - N=N - R_3$$

wherein $R_1$ and $R_2$ represent benzene residues; $R_3$ represents a coupled residue of an azo dye coupling component of the class consisting of sulphonic or carboxylic acids of phenols or naphthols or N-substituted naphthylamines or aminonaphthols; $R_4$ represents a coupled residue of an azo dye coupling component; and in which the azo groups attached to $R_1$ are in the meta position to each other, and the azo groups attached to $R_2$ are in the para position to each other. Said trisazo dyes contain at least two carboxylic or sulphonic acid groups. The characteristic structure is shown in greater detail in the following formula:

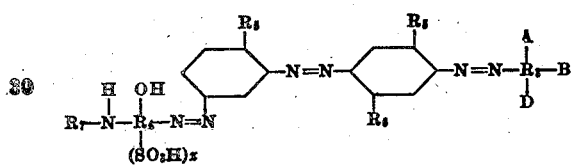

wherein $R_3$ represents a benzene or naphthalene residue; $R_4$ represents a naphthalene nucleus, $R_5$ represents hydrogen, an alkyl or alkoxy group; $R_6$ represents hydrogen or an alkyl group; $R_7$ represents hydrogen, an aryl or acyl group; A represents hydrogen, an amino or substituted amino group; B represents H or OH group; D represents COOH or $SO_3H$ group, and $x$ is 1 or 2. These trisazo dyes are characterized by dyeing regenerated cellulose materials in even level shades. By varying the several substituent groups within the indicated limits colors and shades may be produced as desired.

The present invention relates to methods of dyeing regenerated cellulose materials or viscose rayon in even level shades by means of such trisazo dyes. The viscose rayon may be directly dyed producing dyeings having a satisfactory even, level shade.

The present invention is broad in scope. Even level dyeing are produced by any dye of the structure given. Production of even level shades on regenerated cellulose has long been a commercial problem. This invention represents a satisfactory solution thereof. Shades and colors may be obtained at will without sacrificing the even level properties of the dyeing. Included in the generic structural arrangement are several advantageous subgeneric structural arrangements. Among these are:

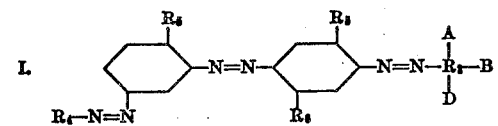

wherein $R_3$ represents a benzene or naphthalene residue; A represents hydrogen, an amino or substituted amino group; B represents hydrogen or an OH group; D represents a COOH or $SO_3H$ group; $R_5$ represents H, $CH_3$ or $OCH_3$; $R_6$ represents H or $CH_3$, and $R_4$ represents the coupled residue of an aminonaphthol sulphonic acid.

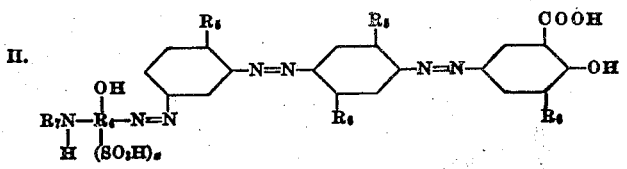

wherein $R_7$ represents hydrogen, an aryl or acyl group and $x$ is 1 or 2.

III. 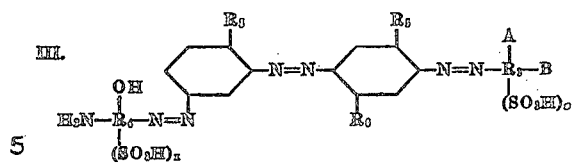

wherein $R_9$ represents a naphthalene residue.

IV. 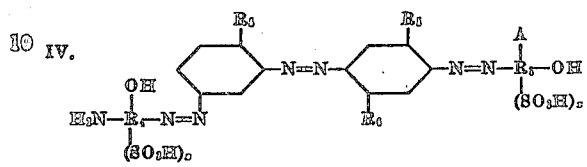

wherein A represents H or an amino group, and $R_8$ represents a naphthalene residue.

V. 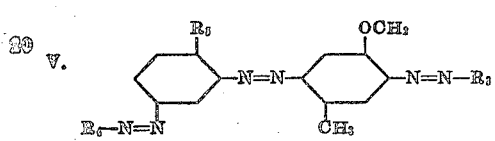

VI. 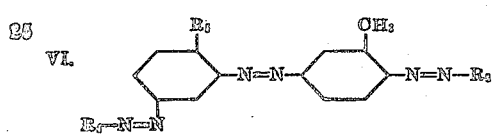

VII. 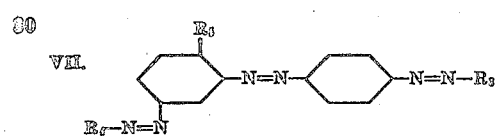

VIII. 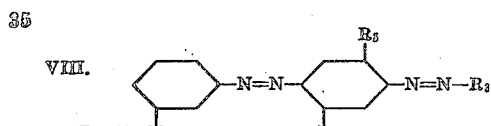

IX. 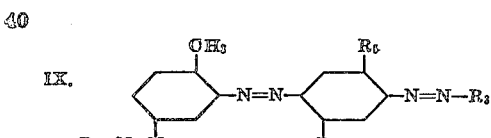

X. 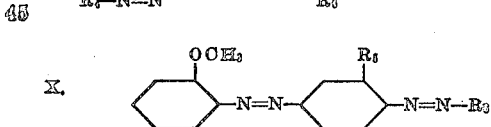

Any of the dyestuffs within the classes set forth above may be used in the present process. Dyeing viscose rayon with these dyes is a rather simple procedure. For instance, a suitable dye bath may be made up from a sufficient amount of water and dyestuff, and the regenerated cellulose material entered in the dye bath which is then brought to a boil. A suitable amount of Glauber's salt or common salt is then added and dyeing allowed to go on at or near the boiling temperature for a sufficient length of time. If desired, soap may be added. The dyeings obtained as herein set forth are characterized by having deep even level shades.

In the following examples the parts are by weight.

*Example 1.*—138 parts of meta-nitroaniline are diazotized in a known manner with 69 parts of sodium nitrite and 250 parts of 36 per cent hydrochloric acid and the diazo solution is added to a solution containing 187 parts of aniline-ω-sulphonic acid and 136 parts of sodium acetate crystals. The mixture is stirred until coupling is complete when it is heated up and the sulphonic group is hydrolyzed by adding an excess of sodium hydroxide solution and stirring a short time. The mixture is then made neutral and after addition of common salt the 3-nitro-4-aminoazobenzene is filtered off, and is diazotized with 69 parts of sodium nitrite and 300 parts of 36 per cent hydrochloric acid. The suspension of diazo compound is run into a solution containing 160 parts of sodium salicylate and 400 parts of sodium carbonate. The coupling bath is maintained alkaline and is stirred until combination is complete when it is heated and about 360 parts of sodium sulphide crystals are added. Stirring is continued until reduction is complete when the resultant aminodisazo dyestuff is salted out and filtered off. It is then stirred into water and diazotized by addition of 69 parts of sodium nitrite and 300 parts of 36 per cent hydrochloric acid. The diazo suspension is then stirred into a well cooled solution containing 239 parts of 2-amino-8-naphthol-6-sulphonic acid and 400 parts of sodium carbonate. The mixture is maintained alkaline and stirred until coupling is complete when it is heated and the dyestuff salted out by the addition of common salt. It dyes viscose rayon a reddish-brown shade. This trisazo dye in the form of free acid may be represented by the following formula:

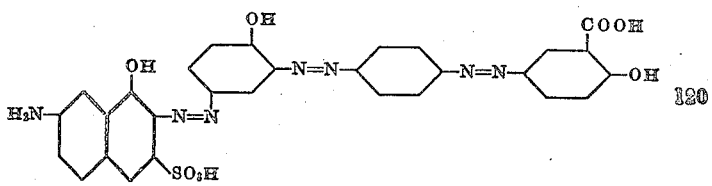

If in place of 239 parts of 2-amino-8-naphthol-6-sulphonic acid in the above example there are used 315 parts of 2-phenylamino-5-naphthol-7-sulphonic acid, the dyestuff obtained dyes viscose rayon a red shade. This trisazo dye in the form of the free acid may be represented by the following formula:

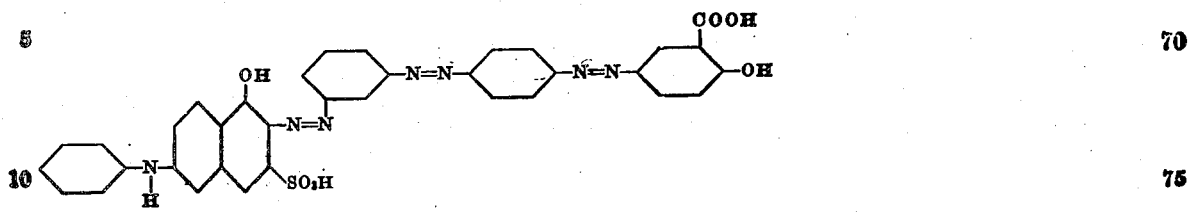

Similarly, by the use of 246 parts of sodium 1-naphthol-5-sulphonate in place of 160 parts of sodium salicylate and 315 parts of 2-phenylamino-8-naphthol-6-sulphonic acid in place of 2-amino-8-naphthol-6-sulphonic acid, there is obtained a dyestuff giving brown dyeings on viscose rayon. This trisazo dye in the form of the free acid may be represented by the following formula:

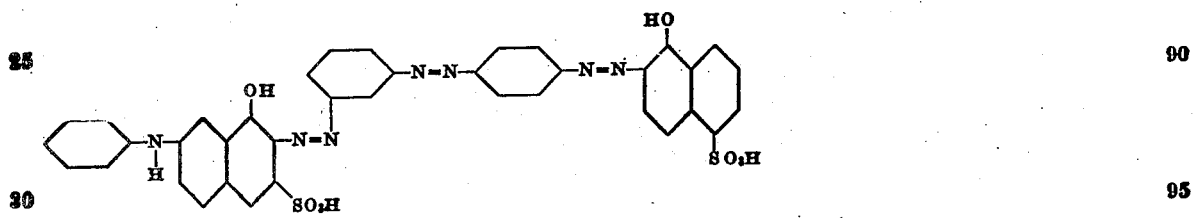

*Example 2.*—138 parts of m-nitroaniline are diazotized in the known manner and the diazo solution is added to a solution of 137 parts of m-amino-p-cresol methyl ether in 100 parts of 36 per cent hydrochloric acid. 136 parts of sodium acetate crystals are added and the mixture is stirred until coupling is complete when the nitroaminoazo dyestuff is filtered off and diazotized with 69 parts of sodium nitrite and 300 parts of hydrochloric acid. The diazo suspension is stirred into a solution of 246 parts of the sodium salt of 2-naphthol-6-sulphonic acid and 400 parts of sodium carbonate. Stirring is continued until coupling is complete, when the mixture is heated up and 360 parts of sodium sulphide crystals are added. After stirring to complete the reduction, the aminodisazo dyestuff is salted out by the addition of common salt and separated. It is then diazotized with 69 parts of sodium nitrite and 300 parts of hydrochloric acid and the diazo suspension is stirred into a cold solution containing 319 parts of 1:8-aminonaphthol-2:4-disulphonic acid. The coupling bath is maintained alkaline and stirred until combination is complete when it is heated up and the dyestuff isolated by the addition of common salt. It forms a dark powder, dyeing viscose rayon a blue shade. This dye has the following formula:

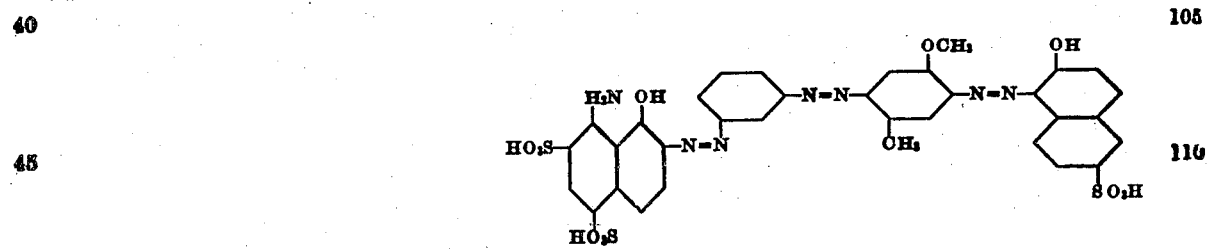

A dyestuff giving somewhat greener dyeings on viscose rayon is obtained by replacing the m-nitroaniline in the preceding example by 169 parts of 4-nitro-o-anisidine and the sodium salt of 2-naphthol-6-sulphonic acid by the sodium salt from a corresponding quantity of 1-naphthol-4-sulphonic acid.

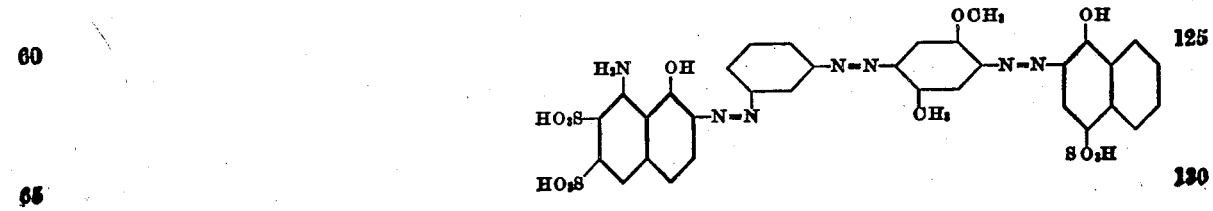

*Example 3.*—169 parts of 4-nitro-2-anisidine are diazotized in the known manner with 69 parts of sodium nitrite and 300 parts of 36 per cent hydrochloric acid and to the diazo solution there are added a solution containing 187 parts of aniline-ω-sulphonic acid and 136 parts of sodium acetate crystals. After stirring until coupling is complete the dyestuff is converted by hydrolysis into a nitroaminoazo dyestuff as described in Example 1. The resultant nitroaminoazo dyestuff is filtered off and diazotized with 69 parts of sodium nitrite and 300 parts of 36 per cent hydrochloric acid. The diazo suspension is stirred into a solution containing 152 parts of o-cresotinic acid and 400 parts of sodium carbonate. The coupling bath is maintained alkaline and stirred until combination is complete, when it is heated up and the dyestuff reduced by the addition of 360 parts of sodium sulphide crystals. When reduction is complete the aminodisazo dyestuff is salted out, separated and diazotized with 300 parts of 38 per cent hydrochloric acid and 69 parts of sodium nitrite. The diazo suspension is stirred into a cold solution of 337 parts of sodium 2-phenylamino-8-naphthol-6-sulphonic acid and 400 parts of sodium carbonate. The mixture is maintained alkaline and stirred until coupling is complete when it is heated up and the dyestuff isolated by the addition of common salt. It dyes viscose rayon a yellowish brown shade. This trisazo dye in the form of the free acid may be represented by the following formula:

A similar dyestuff is obtained if the 4-nitro-2-anisidine of the above example is replaced by 152 parts of 4-nitro-2-toluidine. This dyestuff in the form of the free acid may be represented by the following formula:

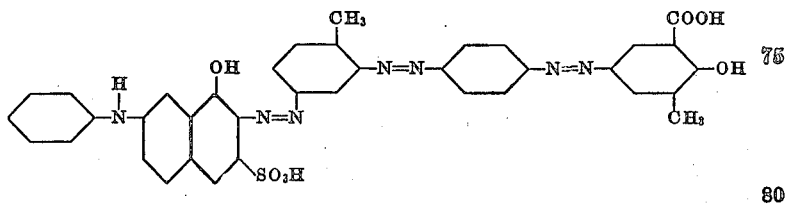

*Example 4.*—138 parts of m-nitroaniline are diazotized in the usual manner and to the diazo solution there is added a solution containing 107 parts of o-toluidine. 136 parts of sodium acetate crystals are added and stirring is continued until coupling is complete, when the 3-nitro-4'-amino-3'-methylazobenzene is filtered off. The nitroaminoazo dyestuff is diazotized and coupled with 138 parts of salicylic acid, according to the procedure indicated in Example 1. The nitro disazo dyestuff is reduced with sodium sulphide and the resultant aminodisazo dyestuff is diazotized and coupled with 239 parts of 2-amino-8-naphthol-6-sulphonic acid in the manner indicated in Examples 1—3. Upon salting out there is obtained a dyestuff giving yellowish-brown dyeings on viscose rayon. This is represented by the formula:

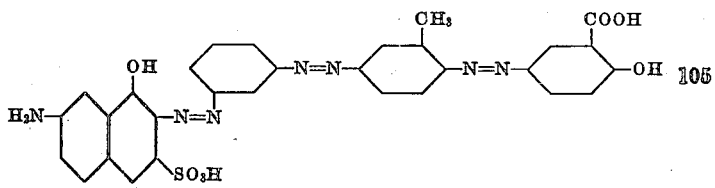

*Example 5.*—242 parts of 3:4'-diamino-5'-methoxy-2'-methylazobenzene are tetrazotized with 300 parts of concentrated hydrochloric acid and 138 parts of sodium nitrite. The suspension of tetrazo compound is stirred into a well cooled solution containing 262 parts of sodium 2-amino-8-naphthol-6-sulphonate and about 600 parts of sodium carbonate. After stirring a short time, there is added a solution containing 237 parts of 2-methyl-amino-naphthalene-7-sulphonic

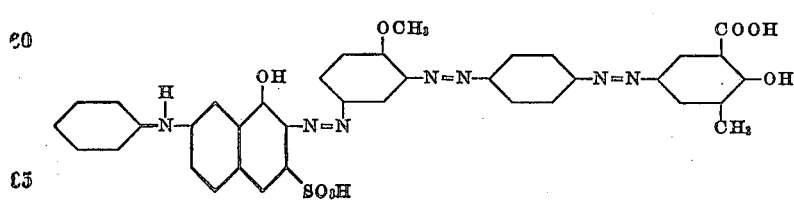

acid. The coupling bath is stirred until combination is complete, when it is heated up and the dyestuff precipitated with common salt. It dyes viscose rayon in brownish black shades. This trisazo dye in the form of the free acid may be represented by the following formula:

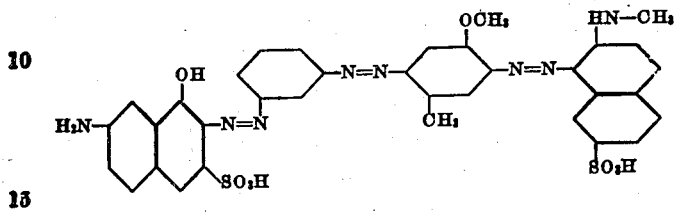

A somewhat similar shade is obtained if in place of the 2-methyl-aminonaphthalene-7-sulphonic acid there is used 319 parts of 2:8-amino-naphthol-3:6-disulphonic acid. This second trisazo dyestuff in the form of the free acid has the following formula:

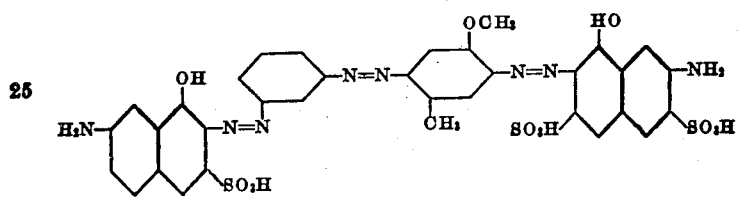

*Example 6.*—242 parts of 3:4'-diamino-5'-methoxy-2'-methylazobenzene are tetrazotized with 300 parts of concentrated hydrochloric acid and 138 parts of sodium nitrite. The suspension of tetrazo compound is stirred into a cold solution of 343 parts of 2-benzoylamino-8-naphthol-6-sulphonic acid, containing about 600 parts of sodium carbonate. After stirring for some time a solution containing 239 parts of 1-amino-5-naphthol-7-sulphonic acid is added and stirring is continued until combination is complete. The dyestuff is then salted out with common salt. It dyes viscose rayon in violet blue shades. This trisazo dyestuff in the form of the free acid may be represented by the following formula:

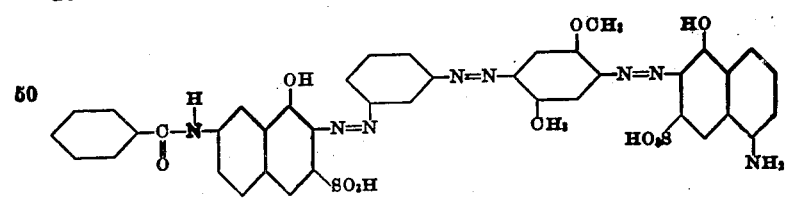

The 3:4'-diamino-5'-methoxy-2'-methylazobenzene is obtained by coupling m-nitrodiazobenzene with meta aminopara cresolmethyl ether and reducing the 3'-nitro-4'-amino-5'-methoxy-2'-methylazobenzene (brown, m. p. about 163° C.) with sodium sulphide. It forms reddish-brown crystals, which, crystallized from toluene melt at 164–5° C. The 3:4-diaminoazobenzene forms brownish crystals and melts at about 210° C. with decomposition. The 3-nitro-4'-aminoazobenzene, forms orange crystals, melting at 208–209° C.

*Example 7.*—A dye bath is made up from 3000 parts of water and 2 parts of the dyestuffs obtained in Example 1. 100 parts of viscose silk are entered into the bath cold, after which the bath is heated up to boiling, 10 parts of Glauber's salt are added and the dyeing is allowed to proceed at or near the boiling temperature for about ½ to ¾ hours. Soap may be added to the dye bath if desired. The dyeing obtained is an even level reddish-brown shade.

If in the above process used there be substituted other dyestuffs given in the modifications of Example 1, there are obtained materials dyed in red and brown shades.

*Example 8.*—A dye bath is made up of from 3000 parts of water and 2 parts of the dyestuff obtained in Example 2. 100 parts of regenerated cellulous silk material are entered into the dye bath, which is then brought to a boil. About 10 parts of Glauber's salt or common salt are then added and the dyeing allowed to proceed at or near the boil for ½ to ¾ hours. If desired, soap may be added. The regenerated cellulose silk material is dyed in an even level blue shade.

If in the above process there is used the other dyestuff mentioned in the modification of Example 2 there is obtained a somewhat greener dyeing.

*Example 9.*—A dye bath is made up from 3000 parts water, a little soap and about 10 parts of Glauber's salt and 2 parts of the dyestuff obtained in Example 3. 100 parts of the viscose rayon material to be dyed are entered into the bath, after which the bath is heated up nearly to the boil and the dyeing carried out for about ½ to ¾ hours. The goods are then removed, rinsed off and dried, the resulting dyeing being an even level brown shade.

Any of the above dyeing processes may be used with any of the dyes of the generic class herein set forth and dyed regenerated cellulose materials obtained which all have an even level shade; the exact shade of course varying with the specific dyestuff used. A dyer using the present invention may produce dyed regenerated cellulose materials having a wide range of colors and shades with an assurance that the dyed product will always have an even level shade; something commercially very much desired and heretofore difficult to obtain.

Having now particularly described and ascertained the nature of my said invention and in what manner the same is to be performed, I declare that what I claim is:

1. In the dyeing of regenerated cellulose materials in even level shades, the process which comprises applying to said regenerated cellulose material from a dye bath, trisazo dyes having the probable formula:

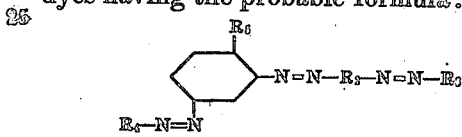

wherein $R_2$ represents a coupled residue of the class consisting of

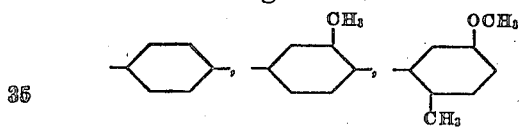

$R_3$ represents a coupled residue of a coupling component of the class consisting of salicylic acid, orthocresotinic acid, 1-naphthol-5-sulphonic acid, 2-naphthol-6-sulphonic acid, 1:4-naphthol-sulphonic acid, 1-amino-5-naphthol-7-sulphonic acid, 2-amino-8-naphthol-3:6-disulphonic acid, and 2-methylamino-naphthalene-7-sulphonic acid, and $R_4$ represents a coupled residue of a coupling component of the class consisting of 2-amino-8-naphthol-6-sulphonic acid, 2-phenylamino-8-naphthol-6-sulphonic acid, 2-benzoylamino-8-naphthol-6-sulphonic acid, 2-phenylamino-5-naphthol-7-sulphonic acid, and 1:8-aminonaphthol-2:4-disulphonic acid, $R_5$ represents H, $CH_3$ or $OCH_3$, thereby dyeing said materials in even level shades.

2. In the dyeing of regenerated cellulose materials in even level shades, the process which comprises applying to said regenerated cellulose material from a dye bath, trisazo dyes having the probable formula:

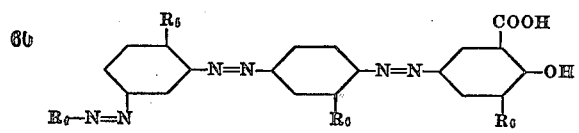

wherein $R_5$ represents H, or an alkyl or alkoxy group, $R_6$ represents H or an alkyl group and $R_4$ represents a coupled residue of an aminonaphthol sulphonic acid, thereby dyeing said materials in even level shades.

3. In the dyeing of regenerated cellulose materials in even level shades, the process which comprises applying to said regenerated cellulose material from a dye bath, trisazo dyes having the probable formula:

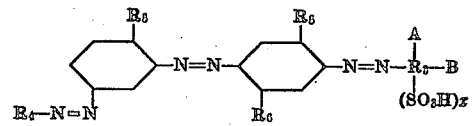

wherein $R_3$ represents a naphthalene residue, A represents H, an amino or substituted amino group, B represents H or OH group, $R_5$ represents H, $CH_3$ or $OCH_3$ group, $R_6$ represents H or $CH_3$ and $R_4$ represents a coupled residue of an amino-naphthol sulphonic acid and $x$ is 1 or 2, thereby dyeing said materials in even level shades.

4. Regenerated cellulose materials dyed with trisazo dyestuffs having the formula:

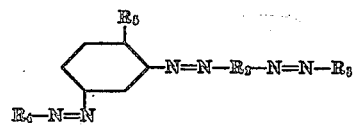

wherein $R_2$ represents a benzene residue, $R_3$ represents the coupled residue of a coupling component of the class consisting of salicylic acid, orthocresotinic acid, aminonaphthol sulphonic acids and N-substituted aminonaphthalene sulphonic acids, and $R_4$ represents an aminonaphthol sulphonic acid and $R_5$ represents H, $CH_3$ or $OCH_3$ and in which the azo groups attached to $R_2$ are in para position with respect to each other, said dyed cellulose materials having an even level shade.

5. Regenerated cellulose materials dyed with trisazo dyestuffs having the formula:

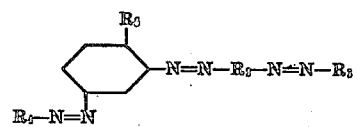

wherein $R_2$ represents a coupled residue of the class consisting of

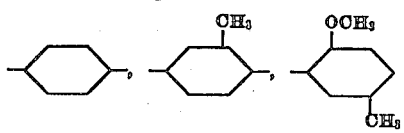

$R_3$ represents a coupled residue of a coupling component of the class consisting of salicylic acid, orthocresotinic acid, 1-naphthol-5-sulphonic acid, 2-naphthol-6-sulphonic acid, 1:4-naphthol-sulphonic acid, 1-amino-5-naphthol-7-sulphonic acid, 2-amino-8-naphthol-3:-6-disulphoonic acid, and 2-methyl-amino-naphthalene-7-sulphonic acid, and $R_4$ represents a coupled residue of a coupling component of the class consisting of 2-amino- 8-naphthol-6-sulphonic acid, 2-phenylamino-8-naphthol-6-sulphonic acid, 2-benzoylamino-8-naphthol-6-sulphonic acid, 2-phenylamino-5-naphthol-7-sulphonic acid, and 1:8-aminonaphthol-2:4-disulphonic acid, $R_5$ represents H, $CH_3$ or $OCH_3$, said dyed cellulose materials having an even level shade.

6. Regenerated cellulose materials dyed with trisazo dyestuffs having the formula:

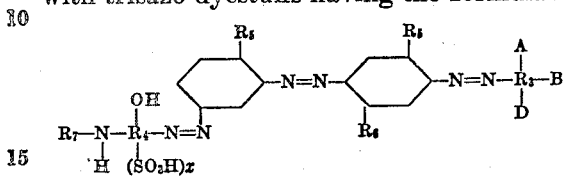

wherein $R_3$ represents a benzene or naphthalene residue, $R_4$ represents a naphthalene residue, $R_5$ represents H, $CH_3$ or $OCH_3$, $R_6$ represents H or $CH_3$, A represents H, an amino or alkyl substituted amino group, B represents H or OH, D represents COOH or $SO_3H$, $R_7$ represents H, a benzene nucleus or acyl group and $x$ is 1 or 2, said dyed cellulose materials having an even level shade.

7. Regenerated cellulose materials dyed with trisazo dyestuffs having the formula:

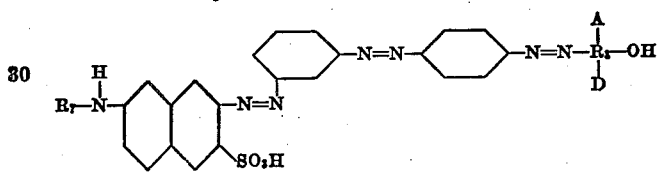

wherein $R_3$ represents a benzene or naphthalene residue, A represents H or an amino group, D represents a COOH or $SO_3H$ group and $R_7$ represents H, a benzene nucleus or acyl group, said dyed cellulose materials having an even level shade.

8. Regenerated cellulose materials dyed with trisazo dyestuffs having the formula:

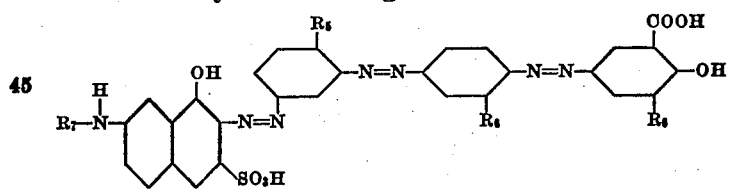

wherein $R_6$ represents H, $CH_3$ or $OCH_3$, $R_5$ represents H or $CH_3$, and $R_7$ represents H or a phenyl group, said dyed cellulose materials having an even level shade.

9. Regenerated cellulose materials dyed with the trisazo dyestuffs having the formula:

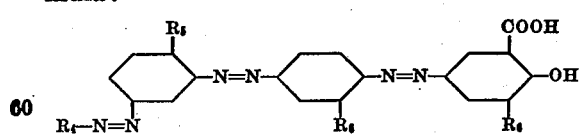

wherein $R_5$ represents H, or an alkyl or alkoxy group, $R_6$ represents H or an alkyl group and $R_4$ represents a coupled residue of an aminonaphthol sulphonic acid, said dyed cellulose materials having an even level shade.

10. Regenerated cellulose materials dyed with trisazo dyestuffs having the formula:

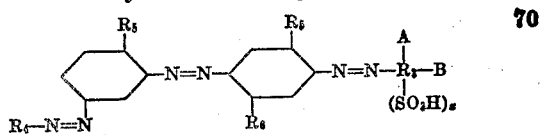

wherein $R_3$ represents a naphthalene residue, A represents H, an amino or substituted amino group, B represents H or OH group, $R_5$ represents H, $CH_3$ or $OCH_3$ group, $R_6$ represents H or $CH_3$ and $R_4$ represents a coupled residue of an aminonaphthol sulphonic acid and $x$ is 1 or 2, said dyed cellulose materials having an even level shade.

In testimony whereof, I affix my signature.

RAINALD BRIGHTMAN.